United States Patent
Buerger et al.

(10) Patent No.: US 7,705,551 B2
(45) Date of Patent: Apr. 27, 2010

(54) SWITCHING FLAP DEVICE

(75) Inventors: Frank Buerger, Dueren (DE); Norbert Ludwig, Koblenz (DE)

(73) Assignee: Pierburg GmbH, Neuss (DE)

( * ) Notice: Subject to any disclaimer, the term of this patent is extended or adjusted under 35 U.S.C. 154(b) by 120 days.

(21) Appl. No.: 11/792,595

(22) PCT Filed: Nov. 8, 2005

(86) PCT No.: PCT/EP2005/055813

§ 371 (c)(1),
(2), (4) Date: Mar. 19, 2008

(87) PCT Pub. No.: WO2006/063906

PCT Pub. Date: Jun. 22, 2006

(65) Prior Publication Data
US 2008/0258582 A1    Oct. 23, 2008

(30) Foreign Application Priority Data
Dec. 17, 2004  (DE) ................ 10 2004 060 714

(51) Int. Cl.
*H02K 29/12* (2006.01)
(52) U.S. Cl. .................... 318/400.37; 324/207.13
(58) Field of Classification Search ........... 318/400.37, 318/461, 400.01; 324/207.13, 207.2
See application file for complete search history.

(56) References Cited

U.S. PATENT DOCUMENTS 6,377,005 B1 * 4/2002 Zintler et al. ................ 318/9
6,563,305 B1 * 5/2003 Sorsa et al. ............... 324/207.2
6,597,645 B2 * 7/2003 Heo ......................... 369/47.16
7,177,757 B2 * 2/2007 Ludwig et al. .............. 701/114

FOREIGN PATENT DOCUMENTS

| DE | 10321653 | 4/2004 |
| GB | 2091423 | 7/1982 |
| WO | WO 98/54547 | 12/1998 |

OTHER PUBLICATIONS

International Search Report dated Nov. 8, 2005 corresponding to International Patent Application No. PCT/EP2005/055813.

* cited by examiner

*Primary Examiner*—Rina I Duda
(74) *Attorney, Agent, or Firm*—Ohlandt, Greeley, Ruggiero & Perle, LLP

(57) ABSTRACT

An actuating device for actuators, such as switching, throttle or swirl flaps, in internal combustion engines for motor vehicles comprises a shaft connected with an actuating motor. The shaft is connected with an actuator, such as a switching flap or the like. In a predetermined position relative to the shaft two pin-type magnets are arranged and preferably connected with a partly toothed gearwheel. When the shaft is rotated, the pin-type magnets move relative to a preferably fixed magnetic field sensor. The magnetic field sensor is a linear Hall sensor. Provision of a linear Hall sensor allows three different shaft positions to be determined. The positions are the two shaft positions defined by the pin-type magnets in which the magnets are arranged opposite the Hall sensor, and a position in which the location of the pin-type magnets does not allow the Hall sensor to detect a magnetic field. In the latter position the linear Hall sensor has a defined bridge voltage.

15 Claims, 1 Drawing Sheet

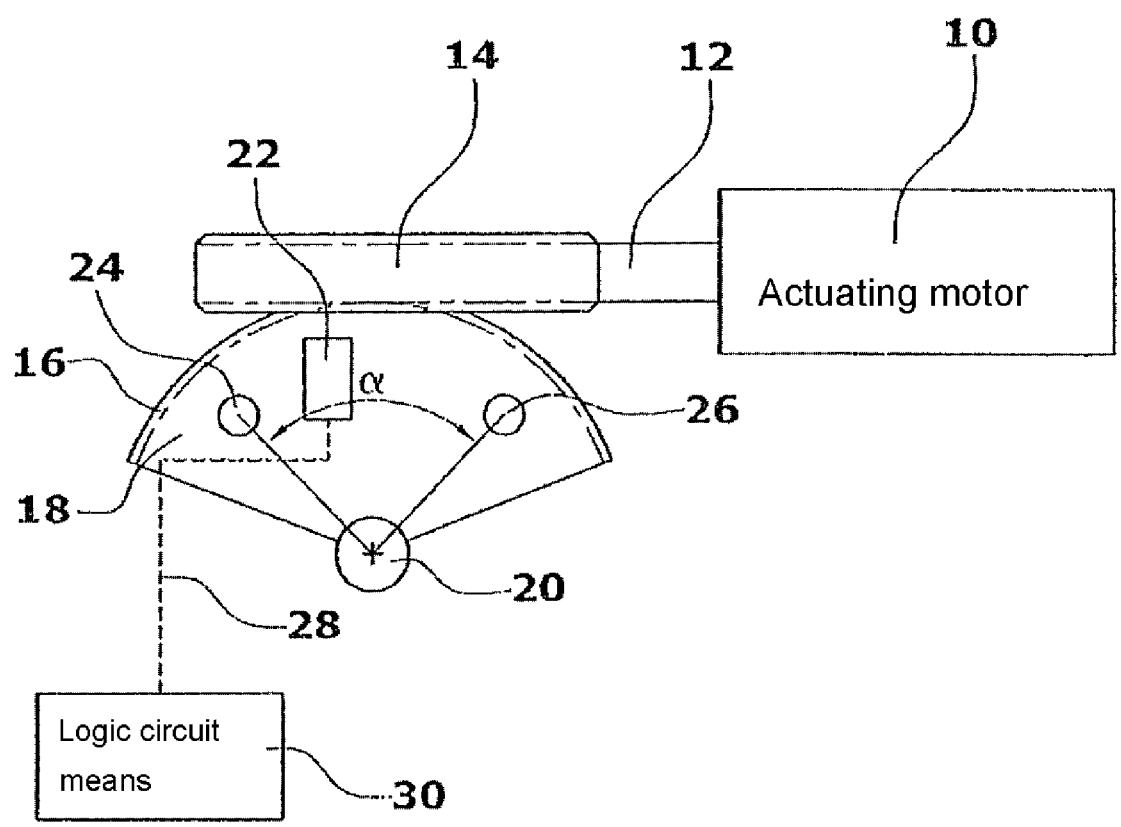

SWITCHING FLAP DEVICE

BACKGROUND

1. Field of the Disclosure

The disclosure relates to an actuating device for actuators, such as switching, throttle or swirl flaps, in internal combustion engines.

2. Discussion of the Background Art

Such actuating devices, which are in particular used for actuators arranged in internal combustion engines of motor vehicles, comprise a typically electric actuating motor, as described in DE 103 21 653, for example. Said actuating motor is connected with a shaft via a gearing. Here, the gearing may comprise a worm gear connected with the motor shaft, and a gearwheel connected with the shaft and/or the driven shaft. Since the driven shaft, which has connected therewith the actuator, i.e. in particular a flap, is frequently only moved in both directions by a specific angle of preferably 90°, a partly toothed gearwheel may be provided instead of a fully toothed gearwheel. The gearwheel has connected therewith two pin-type magnets arranged in spaced relationship to the shaft and at an angle to each other. At a positioning angle of 90° the two pin-type magnets are also arranged at an angle of 90° to each other. In the housing of the actuating device described in DE 103 21 653 a Hall sensor is fixedly arranged. Once a pin-type magnet is arranged opposite the Hall sensor, the Hall sensor generates a voltage signal. Said signal is transmitted to a logic circuit means, wherein the logic circuit means detects only the end position of the actuator and turns off the motor, for example. Simultaneously, the logic circuit means may effect a reversal of the rotation direction of the motor such that, when the actuating motor is operated next, the shaft rotates in the reverse direction and thus the actuator is operated in the reverse direction. The shaft is rotated and the flap is operated until the other pin-type magnet is located opposite the Hall sensor, and again a voltage signal is generated in the Hall sensor. Said voltage signal is again processed by the logic circuit means. Such an actuating device can detect the respective end positions of an actuator, such as a flap. It is however not possible to determine whether an actuator has moved out of the required end position due to vibrations. Here, a change in the required position of the actuator may result in adverse effects on the running behavior of the internal combustion engine, such as reduced power output, increased fuel consumption etc.

It is an object of the disclosure to provide an actuating device which allows an actuator to be arranged outside the required end position in a simple and inexpensive manner.

SUMMARY OF THE DISCLOSURE

The actuator according to the disclosure comprises a shaft connected with an actuating motor for operating an actuator, such as a flap, which is connected with the shaft. Further, two pin-type magnets respectively arranged in a predetermined position relative to the shaft are provided. Here, the pin-type magnets are connected with the shaft such that they move relative to a magnetic field sensor when the shaft rotates. According to the disclosure, a linear Hall sensor is used as a magnetic field sensor. The use of a linear Hall sensor offers the advantage that said sensor generates a voltage both when a magnetic field is detected and when no magnetic field is detected. Thus a linear Hall sensor allows three different shaft positions to be determined. These positions are, on the one hand, two shaft positions which are in particular end positions in which a respective pin-type magnet is arranged opposite the linear Hall sensor. In a third shaft position none of the two pin-type magnets is located opposite the linear Hall sensor. Consequently, the linear Hall sensor does not detect any magnetic field. Due to its configuration, the linear Hall sensor has a defined voltage when it does not detect any magnetic field. Said voltage is in particular a bridge voltage. By providing a linear Hall sensor in combination with two pin-type magnets according to the disclosure, three different shaft positions can be defined in a simple manner.

Preferably, the pin-type magnets are arranged such that each magnet defines a respective end position of the actuator. For this purpose, the pin-type magnets are preferably arranged in spaced relationship to the shaft. It is particularly preferred that the shaft carries a gearwheel, in particular a partly toothed gearwheel, and the pin-type magnets are connected with said gearwheel. The two pin-type magnets are preferably arranged in spaced relationship to the shaft and at an angle to each other, wherein the angle preferably corresponds to the pivoting angle of the actuator.

The two pin-type magnets are preferably arranged such that each magnet points a different pole towards the sensor. This allows the two end positions to be differentiated from each other.

To ensure a defined relative movement between the two pin-type magnets and the linear Hall sensor, the two pin-type magnets preferably are permanently connected with the shaft and/or with the gearwheel which is connected with the shaft. The linear Hall sensor is fixedly arranged in particular in the housing of the actuating device.

BRIEF DESCRIPTION OF THE DRAWINGS

The single FIGURE is a schematic representation of the actuator according the present disclosure.

DETAILED DESCRIPTION OF THE PREFERRED EMBODIMENT

A preferred embodiment of the disclosure will now be described in greater detail with reference to the drawing.

The actuator comprises an actuating motor 10 which preferably is an electric motor. A drive shaft 12 connected with the actuating motor 10 drives a worm 14. The worm 14 meshes with a toothing 16 of a partly toothed gearwheel 18. The partly toothed gearwheel 18 is permanently connected with a shaft 20. The shaft 20 has connected therewith an actuator not shown, such as a switching flap. Operation of the motor 10 causes the worm 14 to rotate and thus the partly toothed gearwheel 18 to rotate. This, in turn, results in a pivoting movement of the actuator connected with the shaft 20.

A linear Hall sensor 22 is fixedly arranged in a housing not shown. The partly toothed gearwheel 18 has permanently connected therewith two pin-type magnets 24,26. The pin-type magnets 24,26 are arranged at an angle α to each other and in spaced relationship to the shaft 20.

When the partly toothed gearwheel 18 has been rotated such that one of the pin-type magnets 24,26 is positioned such that it is arranged opposite the linear Hall sensor 22, the linear Hall sensor generates a signal. Said signal is transmitted to a logic circuit means 30 via a line 28. The logic circuit means 30 then controls the motor 10. Since the position of a pin-type magnet 24,26 opposite the linear Hall sensor 22 preferably defines an end position, generation of the signal preferably causes the motor 10 to be cut off. Further, a reversal of direction is preferably determined for the next motor operation. The two pin-type magnets 24,26 are connected with the gearwheel 18 such that different poles are directed towards the linear Hall sensor 22. This allows the two end positions to be differentiated from each other.

Since a linear Hall sensor 22 is used according to the disclosure, the linear Hall sensor generates a signal even when none of the two pin-type magnets 24,26 is arranged opposite the sensor 22, and the sensor 22 thus does not detect a magnetic field. Here, the sensor 22 generates a voltage, in particular a bridge voltage, whose value differs from the voltage values generated by the sensor 22 when one of the two pin-type magnets 24,26 is located opposite the sensor 22. Provision of the linear Hall sensor 22 according to the disclosure thus allows, on the one hand, detection of the two end positions in which one of the two pin-type magnets 24,26 is arranged opposite the Hall sensor, and, on the other hand, detection of a position in which the actuator is not in one of the two end positions. Normally, the latter is an intermediate position as shown in the drawing. However, it is also possible to detect a shaft 20 position in which the shaft 20 has been rotated beyond one of the end positions. This indicates damage of a flap or breakage of the shaft 20. By providing a linear Hall sensor according to the disclosure, monitoring functions can thus also be realized. In particular, the requirements of OBD II can be fulfilled.

What is claimed is:

1. An actuating device for actuators in internal combustion engines, comprising:
    an actuator motor connected with a shaft for operating an actuator connected with said shaft, and
    two pin-type magnets each arranged in a predetermined position relative to said shaft, said two pin-type magnets moving relative to a magnetic field sensor when said shaft is rotated,
    wherein said magnetic field sensor is a linear Hall sensor for determining three different positions of said shaft, wherein said pin-type magnets are arranged at different polarities towards the sensor, wherein said three different positions comprise a third shaft position is defined by none of the pin-type magnets being arranged opposite the sensor.

2. The actuating device according to claim 1, wherein the position of each pin-type magnet opposite the sensor defines a respective shaft position.

3. The actuating device according to claim 1 wherein said sensor generates a defined voltage, in particular a bridge voltage in the third shaft position.

4. The actuating device according to claim 1, wherein said sensor is fixedly arranged in a housing of the actuating device.

5. The actuating device according to claim 1, wherein said actuating motor is connected with the shaft via a gearing.

6. The actuating device according to claim 1, wherein said shaft is connected with a gearwheel, wherein the gearwheel has connected therewith the pin-type magnets.

7. The actuating device according to claim 1, wherein said pin-type magnets are arranged at an angle ($\alpha$) to each other.

8. The actuating device according to claim 1, wherein said pin-type magnets define end positions of the actuator.

9. An actuating device for an actuator in an internal combustion engine, comprising:
    a toothed gearwheel operatively connectable to a shaft of the actuator
    a worm gear meshed with said toothed gearwheel
    an actuator motor operatively connected with said worm gear;
    a linear Hall sensor;
    a first magnet on said toothed gearwheel at a first position with a first pole facing said linear Hall sensor;
    a second magnet on said toothed gearwheel at a second position with a second pole facing said linear Hall sensor, said second pole being opposite said first pole; and
    a logic circuit in communication with said actuating motor and said linear Hall sensor, said logic circuit receiving from said linear Hall sensor a first voltage signal when a magnetic field of said first magnet is detected, a second voltage signal when a magnetic field of said second magnet is detected, or a third voltage signal when said magnetic field of neither said first nor second magnet is detected, said logic circuit being configured to interpret said third voltage signal as being indicative that said linear Hall sensor is in a position intermediate said first and second magnets.

10. The actuating device according to claim 9, wherein said first position comprises a first end position of the actuator and said second position comprises a second end position of the actuator.

11. The actuating device according to claim 10, wherein said logic circuit causes said actuator motor to cut off upon receipt of either said first or second voltage signals.

12. The actuating device according to claim 10, wherein said logic circuit reverses a direction of said actuator motor for a next motor operation after receipt of said first or second voltage signals.

13. The actuating device according to claim 10, wherein said logic circuit is further configured to interpret said third voltage signal as being indicative that said linear Hall sensor has moved beyond said first end position or beyond said second end position.

14. The actuating device according to claim 9, wherein said third voltage signal comprises a defined bridge voltage having a value that differs from either said first voltage signal or said second voltage signal.

15. The actuating device according to claim 9, further comprising a housing, said linear Hall sensor being fixedly arranged in said housing.

* * * * *